United States Patent
Wang et al.

(10) Patent No.: US 9,252,557 B2
(45) Date of Patent: Feb. 2, 2016

(54) SINGLE CAVITY DUAL-ELECTRODE DISCHARGE CAVITY AND EXCIMER LASER

(71) Applicant: ACADEMY OF OPTO-ELECTRONICS, CHINESE ACADEMY OF SCIENCES, Beijing (CN)

(72) Inventors: Yu Wang, Beijing (CN); Yi Zhou, Beijing (CN); Jinbin Ding, Beijing (CN); Bin Liu, Beijing (CN); Lijia Zhang, Beijing (CN); Jiangshan Zhao, Beijing (CN); Pengfei Sha, Beijing (CN)

(73) Assignee: Academy of Opto-Electronics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 14/040,490

(22) Filed: Sep. 27, 2013

(65) Prior Publication Data

US 2014/0023101 A1    Jan. 23, 2014

Related U.S. Application Data

(63) Continuation of application No. PCT/CN2012/073018, filed on Mar. 26, 2012.

(30) Foreign Application Priority Data

Mar. 2, 2012  (CN) .......................... 2012 1 0053057

(51) Int. Cl.
*H01S 3/22* (2006.01)
*H01S 3/08* (2006.01)
(Continued)

(52) U.S. Cl.
CPC ................ *H01S 3/08* (2013.01); *H01S 3/0385* (2013.01); *H01S 3/076* (2013.01); *H01S 3/2333* (2013.01);
(Continued)

(58) Field of Classification Search
CPC ..... H01S 3/076; H01S 3/2333; H01S 3/0385; H01S 3/08; H01S 3/235; H01S 3/225; H01S 3/2383; H01S 3/005; H01S 3/0388; H01S 3/0384; H01S 3/03; H01S 3/036; H01S 3/08068; H01S 3/10092; H01S 3/09713

USPC .......................... 372/55, 58, 59, 60, 61, 63, 65
See application file for complete search history.

(56) References Cited

U.S. PATENT DOCUMENTS 5,377,215 A *   12/1994  Das et al. ........................ 372/57
2005/0002427 A1*  1/2005  Bragin et al. .................... 372/35
(Continued)

FOREIGN PATENT DOCUMENTS

CN         1596492 A       3/2005
JP         60-118261       6/1985
(Continued)

OTHER PUBLICATIONS

Brown, D. J. W., et al. "XLR 500i: recirculating ring ArF light source for immersion lithography." *SPIE*. vol. 6520. 2007. Downloaded From: http://proceedings.spiedigitallibrary.org/ on Nov. 6, 2013 Terms of Use: http://spiedl.org/terms.
(Continued)

*Primary Examiner* — Yuanda Zhang
(74) *Attorney, Agent, or Firm* — Knobbe, Martens, Olson & Bear, LLP (57) ABSTRACT

A single-cavity dual-electrode discharge cavity and an excimer laser including such a discharge cavity are disclosed. The discharge cavity may comprise a cavity body and two sets of main discharge electrodes. The cavity body may comprise a left chamber and a right chamber arranged to form a symmetric dual-chamber cavity. The left and right chambers can interface and communicate with each other at a plane of symmetry of the entire discharge cavity. The two sets of main discharge electrodes can be disposed in the left and right chambers on the upper side, respectively. According to the present disclosure, the single-cavity configuration can be used to achieve functions of dual-cavity configurations, such as MOPA, MOPO, and MOPRA. Thus, it is possible to reduce system complexities and also ensure synchronization of discharging in the discharge cavity.

18 Claims, 7 Drawing Sheets

(51) Int. Cl.
*H01S 3/07* (2006.01)
*H01S 3/23* (2006.01)
*H01S 3/038* (2006.01)
H01S 3/0971 (2006.01)
H01S 3/225 (2006.01)
H01S 3/00 (2006.01)
H01S 3/03 (2006.01)
H01S 3/036 (2006.01)
H01S 3/10 (2006.01)

(52) U.S. Cl.
CPC .. *H01S 3/005* (2013.01); *H01S 3/03* (2013.01); *H01S 3/036* (2013.01); *H01S 3/0384* (2013.01); *H01S 3/0388* (2013.01); *H01S 3/08068* (2013.01); *H01S 3/09713* (2013.01); *H01S 3/10092* (2013.01); *H01S 3/225* (2013.01); *H01S 3/235* (2013.01); *H01S 3/2383* (2013.01)

(56) References Cited

U.S. PATENT DOCUMENTS

| | | | |
|---|---|---|---|
| 2006/0222034 A1* | 10/2006 | Ujazdowski et al. | 372/57 |
| 2006/0227839 A1* | 10/2006 | Besaucele et al. | 372/55 |
| 2006/0273732 A1* | 12/2006 | Korobochko et al. | 315/111.21 |
| 2008/0285602 A1 | 11/2008 | Nagai et al. | |
| 2010/0098120 A1 | 4/2010 | Ye et al. | |

FOREIGN PATENT DOCUMENTS

| | | | |
|---|---|---|---|
| JP | 59-004247 | 8/1985 | |
| JP | 60-118261 U | 8/1985 | |
| JP | 62-2678 A | 1/1987 | |
| JP | 62-95884 A | 5/1987 | |
| JP | 63-229876 A | 9/1988 | |
| JP | 02240980 A * | 9/1990 | ............. H01S 3/038 |
| JP | 05-082879 | 4/1993 | |
| JP | 06-152004 | 5/1994 | |
| JP | 08-125253 | 5/1996 | |
| JP | 2718379 B2 | 11/1997 | |
| JP | 2001-168432 | 6/2001 | |
| JP | 2001-298229 | 10/2001 | |
| JP | 2003-298155 | 10/2003 | |
| JP | 2005-183427 | 7/2005 | |
| KR | 20060025234 | 3/2006 | |
| WO | WO2010/111119 | 9/2010 | |

OTHER PUBLICATIONS

Ishihara, Toshihiko, et al. "Long-term reliable operation of a MOPA-based ArF light source for microlithography." *Proceedings of SPIE.* vol. 5377. 2004.

Trintchouk, Fedor, et al. "XLA 300: the fourth-generation ArF MOPA light source for immersion lithography." *SPIE.* vol. 6154. 2006. Downloaded From: http://spiedigitallibrary.org/ on Nov. 6, 2013 Terms of Use: http://spiedl.org/terms.

Watanabe, Hidenori, et al. "Reliable High Power Injection Locked 6kHz 60W Laser for ArF Immersion Lithography." *Proc. SPIE.* vol. 6520. 2007.

Office Action mailed Aug. 5, 2014 received in Japanese patent application No. 2014-501423.

International Search Report received in PCT/CN/2012/073018 mailed Dec. 13, 2012.

* cited by examiner

SINGLE CAVITY DUAL-ELECTRODE DISCHARGE CAVITY AND EXCIMER LASER

CROSS-REFERENCE TO RELATED APPLICATIONS

This application claims the benefit of PCT/CN2012/073018, filed on Mar. 26, 2012, which is incorporated herein by reference in its entirety.

TECHNICAL FIELD

The present disclosure relates to the laser field, and particularly, to a single-cavity dual-electrode discharge cavity for photolithography and an excimer laser including such a discharge cavity. The discharge cavity according to the present disclosure is also applicable to other apparatus where gas is excited to generate energy radiation.

BACKGROUND

Excimer lasers are commonly used gas lasers oriented to ultraviolet applications. At present, the excimer lasers are considered as best candidates for light sources for photolithography, and are predominant working light sources in the Integrated Circuit (IC) photolithography industry.

Conventional discharge excited excimer lasers adopt a single-cavity single-electrode configuration. With the further development of the photolithography technology, the light sources are desired to meet requirements of narrower spectral width (line width), higher repetition rate, and greater average power. However, the conventional single-cavity single-electrode configuration can hardly meet all these three requirements at one time. This tends to cause a significant compromise between performance enhancement and cost efficiencies in laser designs. Difficulties in improvement of the single cavity configuration of the conventional lasers mainly consist in great energy losses in line narrowing modules and damages and life spans of optics under high-power laser radiation.

To effectively narrow the spectral width and enhance laser output power, a dual-cavity configuration was proposed to design a laser. A fundamental concept of this configuration consists in that narrowing of the line width and enhancement of the laser output power are achieved in different gas discharging modules (specifically, a seed cavity and an amplifier cavity), respectively. Specifically, the seed cavity generates seed light with a narrow line width at a certain repetition rate, to achieve laser oscillation and radiation at low power. The amplifier cavity performs pulse energy amplification on the incident seed light. Lasers based on the dual-cavity configuration have output characteristics such as control of narrowed spectrum and output of relatively high single-pulse energy, which are necessary for the light sources for photolithography.

The lasers based on the dual-cavity configuration can be increasingly optimized in both the master oscillator module and the amplifier module, by optimizing components and pressure of a working gas mixture, exciting voltages and the like, to enhance the output characteristics, so as to achieve laser outputs with a narrow line width at high power. Further, due to the power amplification mechanism based on the amplifier cavity, the master oscillator has a relatively low laser output, resulting in significantly increased life spans of optics in the line narrowing module. Because of the above advantages of the lasers based on the dual-cavity configuration, laser designs based on the "seed-amplification" mechanism are widely used in modern light sources for the photolithography industry.

Figure 2:
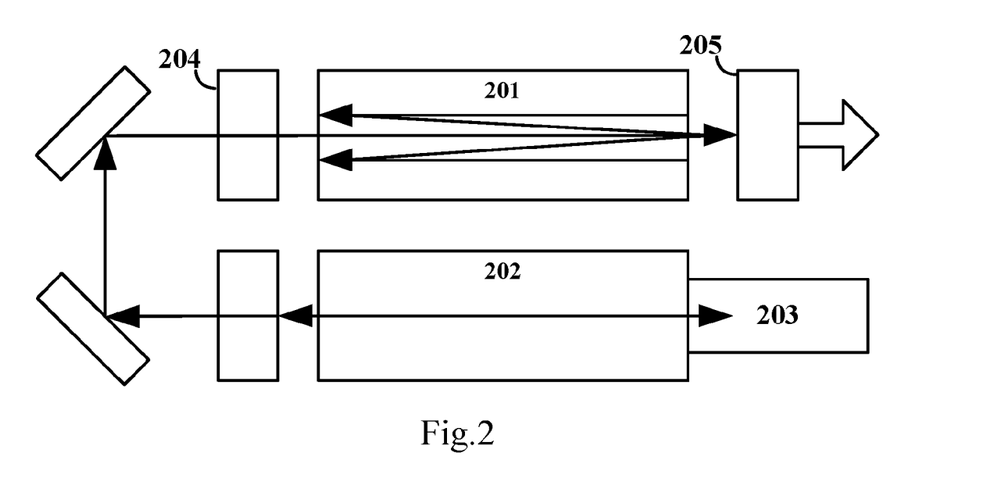
FIG. 2 is a structural view showing a dual-cavity MOPO excimer laser according to the related art.
Figure 3:
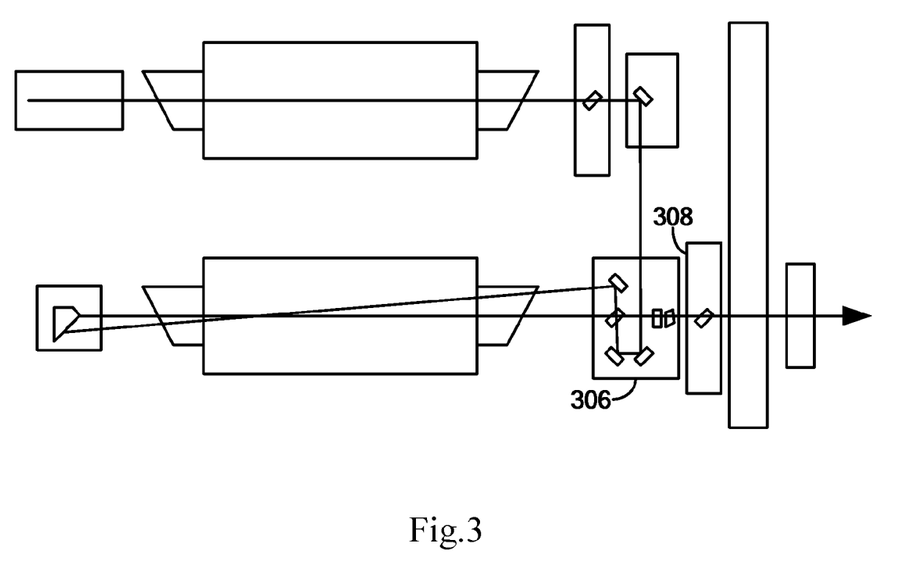
FIG. 3 is a structural view showing a dual-cavity MOPRA excimer laser according to the related art.

The dual-cavity designs can be classified mainly into three types, i.e., a dual cavity Master Oscillator Power Amplifier (MOPA), a dual cavity Master Oscillator Power Oscillator (MOPO), and a dual cavity Master Oscillator Power Regenerative Amplifier (MOPRA) which is an improvement of MOPA. Structural details for these designs are shown in FIGS. 1, 2, and 3, respectively.

Figure 1:
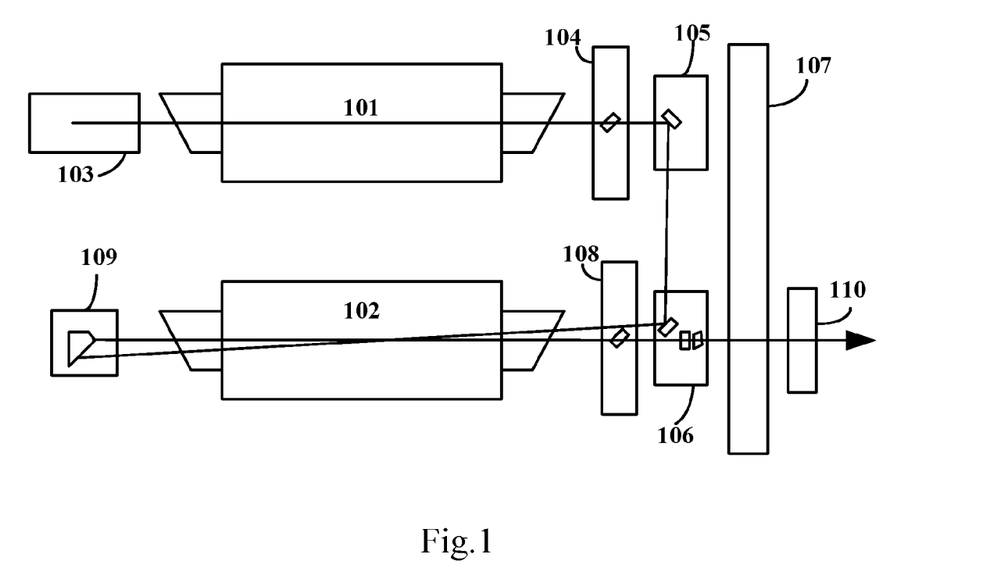
FIG. 1 is a structural view showing a dual-cavity MOPA excimer laser according to the related art.

FIG. 1 is a structural view showing a dual-cavity MOPA excimer laser according to the related art. As shown in FIG. 1, the dual-cavity MOPA excimer laser comprises a Master Oscillator (MO) cavity 101, a Power Amplifier (PA) cavity 102, a Line Narrowing Module (LNM) 103, a Linewidth Analyzing Module (LAM) 104, a MO light-path conversion and control module (MO WEB) 105, a PA light-path conversion and control module (PA WEB) 106, an Optical Pulse Stretcher (OPS) 107, a Bandwidth Analysis Module (BAM) 108, a penta prism 109, and an auto shutter 110.

The MOPA configuration is a laser system design which was firstly used in advanced light sources for photolithography. This configuration was described in US 2002/0044586 A1, US 2006/0126697 A1, and U.S. Pat. No. 6,690,704 B2. As stated in the document, "Recent Developments in ArF Excimer Laser Technology for Photolithography," pp. 523-524, in the MOPA configuration, the capability to amplify the laser energy is limited due to a limited number of passes of the laser through the amplifier cavity. As a result, the MO (Master Oscillator) cavity needs to output higher laser power to satisfy the requirements on the light sources. Specifically, the output from the MO cavity, after being line-width narrowed, should convey the seed light at power of about 1 mJ to the PA (Power Amplifier) cavity. The relatively great energy losses caused by the line-width narrowing mechanism results in a relatively low conversion efficiency. Discharging excitement at high power makes the MO cavity have a significantly lowered life span. Further, the output from the PA cavity is affected by a precision of synchronization of discharging between the MO cavity and the PA cavity. Thus, the stability of the laser energy output need to be further improved.

The above deficiencies of the MOPA configuration can be eliminated by the MOPO configuration based on the injection lock technology and the MOPRA configuration based on the recirculating ring technology.

FIG. 2 is a structural view showing a dual-cavity MOPO excimer laser according to the related art. As shown in FIG. 2, the dual-cavity MOPO excimer laser comprises a Power Oscillator (PO) cavity 201, a PA cavity 202, a LNM 203, and alight path system including a concave mirror 204 and a convex mirror 205.

US 2008/0285602 A1 discloses a design based on the MOPO dual-cavity configuration.

FIG. 3 is a structural view showing a dual-cavity MOPRA excimer laser according to the related art. As shown in FIG. 3, the dual-cavity MOPRA excimer laser is an improvement of the MOPA configuration, and is configured like MOPA, except that a PA web 306 and a BAM 308 are exchanged in position. Thus, the seed light can get a multi-pass gain.

US 2010/098120 A1 discloses a design based on the MOPRA ring cavity configuration.

In the MOPA configuration, the seed light gets only a limited number of multi-pass gains through the PA cavity, and thus the MO cavity needs to inject the seed light of about 1 mJ into the PA cavity to achieve the laser output of about 10 mJ. In the MOPO configuration based on the injection lock technology and the MOPRA configuration based on the recirculating ring technology, the amplifier cavity can achieve a multi-pass gain, instead of the limited number of multi-pass gains in the MOPA configuration. The PO cavity and the PRA (Power Regenerative Amplifier) cavity operate in an oscillation and amplification status, and the seed light gets a multi-pass gain. As a result, the seed light of only 100-200 µJ will result in the laser output of 15 mJ. The injection lock technology and the recirculating ring technology has a significant feature that the seed light, after being injected into the amplifier cavity, goes forward and backward and resonates in the amplifier cavity, and the amplifier cavity operates in a deep saturation status. They thus exhibit advantages such as greater energy and more stable output, as compared with the MOPA configuration.

The MOPA, MOPO, and MOPRA configurations are all based on a dual discharge cavity configuration. Lasers based on the dual-cavity configuration are more expensive, bulkier, and more complex in manufacture and manipulation, as compared with conventional lasers based on a single-cavity configuration. Specifically, the lasers based on the dual-cavity configuration put a stringent requirement on synchronization of discharging in order to achieve a good energy amplifying property, leading to difficulties in synchronizing discharging. In addition, the lasers based on the dual-cavity configuration are complex in structural aspects, resulting in increased difficulties in manipulation such as mounting and adjusting of peripheral components.

SUMMARY

1. Technical Problems to be Solved

In view of the above disadvantages, such as complexities in structural aspects, of the MOPA, MOPRA, and MOPO configurations in the existing dual-cavity excimer lasers, the present disclosure provides, among others, a novel single-cavity dual-electrode discharge cavity and a corresponding excimer laser, by which it is possible to alleviate or eliminate the problems of the dual-cavity lasers, such as high cost, bulk, and complexities in manufacture and manipulation, and also to achieve an excellent laser beam output with a narrow line-width at high power.

2. Technical Solutions

To achieve an excellent laser beam output with a narrow line-width at high power, while ensuring synchronization of discharging in a discharge cavity, there is provided a single-cavity dual-electrode discharge cavity, by which it is possible to achieve functions of the dual-cavity MOPA, MOPO, and MOPRA configurations.

According to an aspect of the present disclosure, there is provided a single-cavity dual-electrode discharge cavity, comprising: a cavity body including a left chamber and a right chamber arranged to form a symmetric dual-chamber cavity, wherein each of the chambers has a cross section which is relatively small on an upper side while relatively large on a lower side, and the left and right chambers interface and communicate with each other at a plane of symmetry of the entire discharge cavity; and two sets of main discharge electrodes each disposed in the left and right chambers, respectively, and having a discharge region respectively positioned in the left and right chambers on the upper side.

Each set of the main discharge electrodes may comprise an anode and a cathode with the discharge region formed between a discharge surface of the anode and a discharge surface of the cathode.

Each of the cathodes may be mounted on an insulating plate which is hung at a top end of each of the left and right chambers, and each of the anodes may be fixed onto an anode mount which is fixed on the cavity body at such a position that the anode and the cathode are parallel to each other and face each other.

The single-cavity dual-electrode discharge cavity may further comprise a pressing bar and a peaking capacitor for discharging and storing energy. The insulating plate may be fixed to the cavity by the pressing bar. The pressing bar may be positioned outside the insulating plate, be connected to an end of the peaking capacitor through copper sheets, and constitute a grounded connection with the cavity body.

The other end of the peaking capacitor may be connected to a high-voltage pulsed power supply through a conductive metal bar.

The single-cavity dual-electrode discharge cavity of the present disclosure may further comprise a pre-ionization device positioned on sides of the main discharge electrodes.

There can be two sets of the pre-ionization devices for each of the chambers, each of which is positioned on opposite sides of each set of the main discharge electrodes, respectively.

There can be one set of the pre-ionization device for each of the chambers, which is positioned on the sides of the main discharge electrodes upstream of the discharge region.

The pre-ionization device may comprise an upper portion and a lower portion, each of which comprises a ceramic tube and a pre-ionization electrode, wherein the pre-ionization electrode is positioned inside the ceramic tube.

The ceramic tube of the upper portion of the pre-ionization device may be fixed onto the cathode through an insulator, and the ceramic tube of the lower portion of the pre-ionization device may be fixed onto the anode through an insulator.

Each of the anodes may be connected to the cavity body of the discharge cavity through a set of copper sheets.

The single-cavity dual-electrode discharge cavity may further comprise a fan system configured to drive gases inside the discharge cavity.

The single-cavity dual-electrode discharge cavity may further comprise a heat dissipation system configured for heat dissipation from the discharge cavity.

The single-cavity dual-electrode discharge cavity may further comprise a dust collecting system configured to collect dust in the discharge cavity.

The single-cavity dual-electrode discharge cavity may further comprise a noise reduction system configured to reduce noises in the discharge system.

According to a further aspect of the present disclosure, there is provided a single-cavity dual-electrode MOPA laser comprising the single-cavity dual-electrode discharge cavity as described above.

According to a further aspect of the present disclosure, there is provided a single-cavity dual-electrode MOPO laser comprising the single-cavity dual-electrode discharge cavity as described above.

According to a further aspect of the present disclosure, there is provided a single-cavity dual-electrode MOPRA laser comprising the single-cavity dual-electrode discharge cavity as described above.

3. Advantages

According to the present disclosure, a single-cavity dual-electrode structure is used, instead of two single-cavity single-electrode structures, such as those in the MOPA, MOPRA, or MOPO configuration. As a result, it is possible to achieve a dual cavity of a MOPA configuration (a single-cavity MOPA configuration) and a MOPO configuration (a single-cavity MOPO configuration) based on one single-cavity structure, and also to reduce system complexities and ensure synchronization of discharging in the discharge cavity.

Further, the single-cavity structure helps in incorporating and adjusting of peripheral optics of the discharge cavity, and thus further simplifies the laser system.

The single-cavity dual-electrode laser can achieve two channels of laser outputs.

Furthermore, with the single-cavity dual-electrode structure, it is possible to effectively reduce complexities of the laser system, and thus to reduce difficulties in mounting and adjusting of the peripheral components.

In one word, the single-cavity dual-electrode laser can achieve two channels of a superior quality of laser outputs with a narrow line-width at high power.

DETAILED DESCRIPTION

Objects, features and advantages of the present disclosure will become more apparent from the following detailed descriptions of specific embodiments thereof with reference to attached drawings.

1. Basic Configuration of Single-Cavity Dual-Electrode Discharge Cavity

Figure 4:
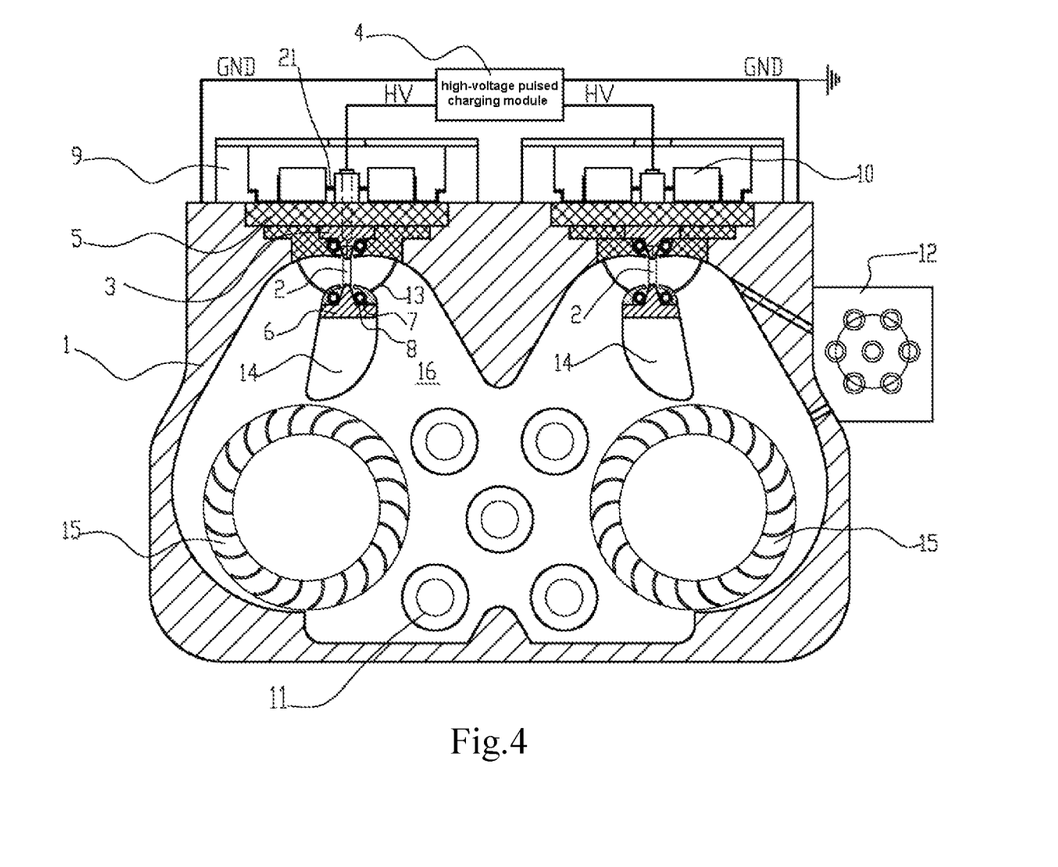
FIG. 4 is a structural view showing a discharge cavity for a single-cavity dual-electrode excimer laser according to an embodiment of the present disclosure.

FIG. 4 is a structural view showing a single-cavity dual-electrode discharge cavity according to an embodiment of the present disclosure. As shown in FIG. 4, the discharge cavity mainly comprises a cavity body 1, two sets of main discharge electrodes, two sets of gas cycling systems, a heat dissipation system, a dust collecting device, and a high-voltage pulsed charging module 4.

The cavity body 1 is a sealed gas container, and is designed according to standards relevant to pressure vessels. The cavity body 1 may store a corrosive gas mixture at about 3-6 atm, for example, halogen gases including $F_2$ which are commonly used to generate excimers.

According to an embodiment, the discharge cavity comprises two chambers, a left one and a right one, which are arranged to form a symmetric dual-chamber cavity. Each of the chambers may have a cross section which is relatively small on an upper side while relatively large on a lower side, so as to form, for example, a "pear" shape as shown in FIG. 4. The two chambers interface and communicate with each other at a plane of symmetry of the entire discharge cavity.

According to an embodiment, the discharge cavity comprises two sets of main discharge electrodes disposed in the left and right chambers, respectively. The main discharge electrodes can be positioned so that their discharge regions 2 are placed respectively in the left and right chambers on the upper side. Each set of the main discharge electrodes may comprise an anode 6 and a cathode 3. The cathode is mounted onto an insulating plate 5 by means of, for example, bolts, and the insulating plate 5 is hung at a top end of each of the left and right chambers. The anode 6 is fixed onto an anode mount 14 by means of, for example, screws, and the anode mount 14 is fixed onto the cavity body 1 of the discharge cavity at such a position that the anode 6 and the cathode 3 are parallel to each other and face each other. A distance between the two sets of the main discharge electrodes is designed to ensure the discharge regions 2 each have a sufficient energy density and can satisfy dimensional requirements for laser outputs. For example, the distance can be set as about 10-30 mm.

The discharge cavity of the present disclosure further comprises a high-voltage pulsed charging module 4, which is a high-voltage power supply, and is configured to inject sufficient energy into the discharge regions 2 of the discharge cavity. The high-voltage pulsed charging module 4 can be positioned above the main discharge electrodes, and is configured to inject the energy into the respective cathodes of the two sets of main discharge electrodes via peaking capacitors 10, respectively, to supply a discharging voltage, which is sufficient to break down the gases in the discharge regions, thereto. The high-voltage pulsed charging module 4 can be designed based on the all solid state pulsed power supply technology.

Figure 5:
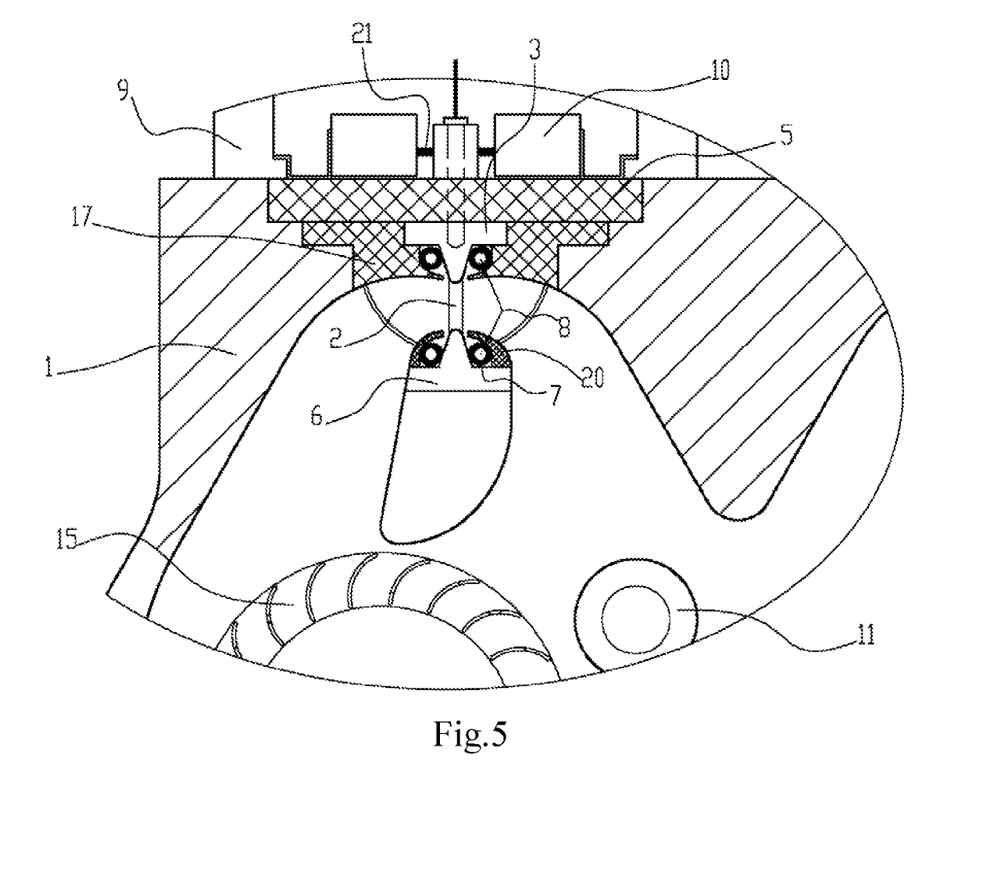
FIG. 5 is a view showing more details of a discharge region of the laser according to an embodiment of the present disclosure.

FIG. 5 is a view showing more details of one of the discharge regions of the laser according to an embodiment of the present disclosure. As shown in FIG. 5, the discharge region 2 comprises a space between the respective discharge surfaces of the anode and the cathode, and has a length approximately corresponding to a length of the electrodes, a height corresponding to a distance of the operating surfaces of the anode and the cathode, and a width slightly greater than a width of the discharge surfaces of the electrodes.

Still referring to FIG. 5, each set of the main discharge electrodes comprises the cathode 3 and the anode 6. The cathode 3 is connected to the high-voltage pulsed charging module 4. Each of the cathodes 3 is fixed onto the insulating plate 5 by means of bolts, and thus is supported by the insulating plate 5. The insulating plate 5 may be made of a material resistive to corrosion of $F_2$ and the like, such as, $Al_2O_3$ ceramic of high purity. Each of the anodes 6 is connected to the cavity body 1 of the discharge cavity through a set of copper sheets 13, and the cavity body is grounded. Further, the copper sheets 13 can function to homogenize a flow field, and reduce impedance between the anode 6 and the ground.

The discharge cavity may further comprise pressing bars 9 and a peaking capacitor 10. Each of the insulating plates 5 is fixed to the discharge cavity by two pressing bars 9, and is sealed by means of an O-shaped ring. The pressing bar 9 is positioned outside the insulating plate, is connected to an end of the peaking capacitor 10 through a copper sheet, and constitutes a grounded connection with the cavity body of the discharge cavity. The peaking capacitor 10 is used for discharging and storing energy, and has the other end connected to the high-voltage pulsed power supply 4 through a conductive metal bar 21.

Figure 6:
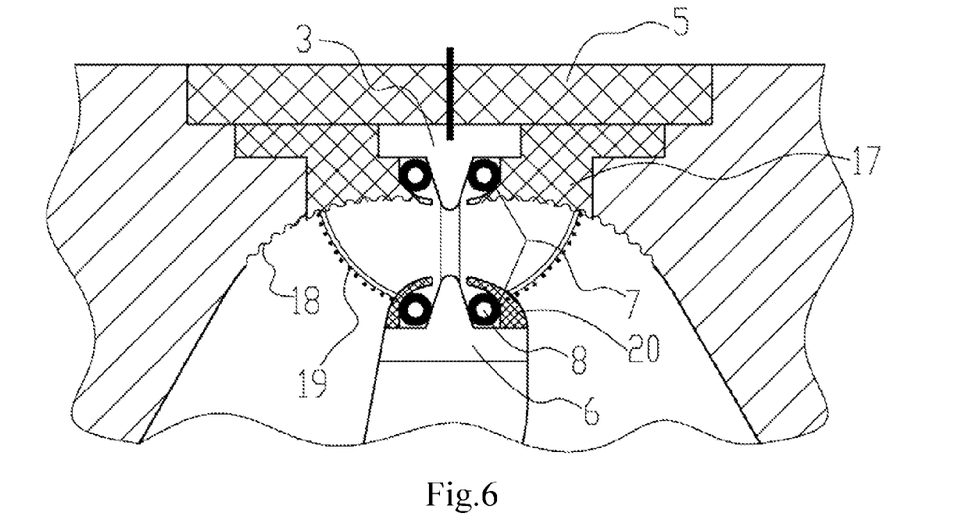
FIG. 6 is a view showing a noise reduction mechanism in the discharge region of the laser according to an embodiment of the present disclosure.

As shown in FIG. 6, the discharge cavity may further comprise a pre-ionization device provided on sides of each set of the main discharge electrodes. The pre-ionization device may comprise two portions, an upper portion and a lower portion, each of which comprises a ceramic tube 7 and a pre-ionization electrode 8. The ceramic tube 7 comprises an insulating material, and the pre-ionization electrode 8 is provided inside the ceramic tube 7. The ceramic tube 7 of the upper portion of the pre-ionization device is fixed onto the cathode 3 through an insulator 17 at an adequate precision of the mounding position, and the ceramic tube 7 of the lower portion of the pre-ionization device is fixed onto the anode 6 through an insulator 20 at an adequate precision of the mounting position.

Because the working gases in the cavity are highly corrosive, all the components, such as the cavity body, the insulators, and the electrodes, in contact with the gases comprise materials resistive to corrosion. Specifically, the cavity body 1 may comprise an Al alloy material, and the electrodes 3, 6, and 8 may comprise brass or aluminum bronze. All these materials can react with the highly corrosive gases to produce a compact oxide film on their surfaces, which prevent further reaction between them and the highly corrosive gases and thus achieve the protection purpose. Based on such characteristics of the materials, a newly manufactured laser cavity needs a period of time for passivation, such as, fluorine passivation, of the cavity body 1 of the discharge cavity.

2. Arrangement of Pre-Ionization Device in Single-Cavity Dual-Electrode Discharge Cavity Arrangement of the pre-ionization device in the laser discharge cavity according to an embodiment of the present disclosure will be described in hereinafter with reference to FIG. 7. Before the main discharge occurs, a certain number of initial electrons can be produced through pre-ionization, facilitating a uniform distribution of electron avalanche in the discharge space. The pre-ionization functions to prevent streamer from occurring and thus to achieve uniform discharging.

Figure 7:
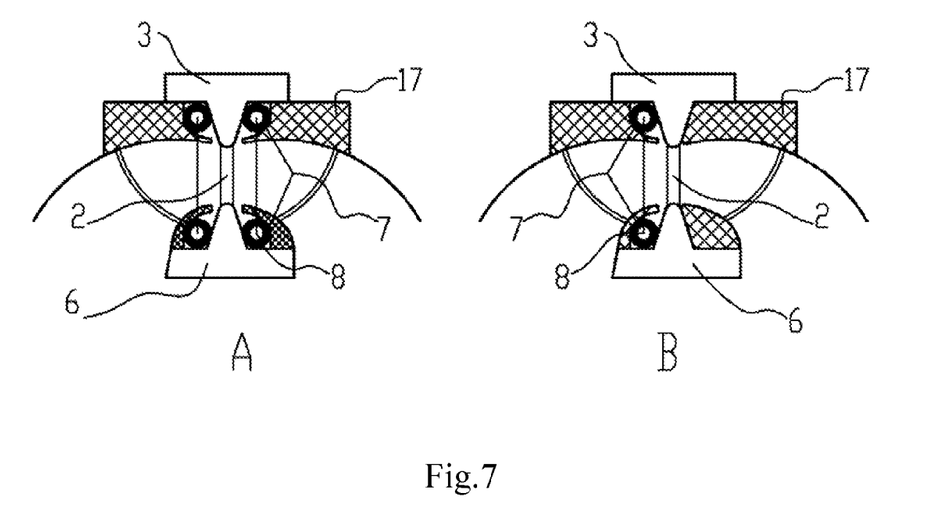
FIG. 7 is a view showing a pre-ionization mechanism in the discharge cavity for the laser according to an embodiment of the present disclosure.

As shown FIG. 7, an upstream area and a downstream area are defined with respect to the flow of the working gases in the discharge region. In an example shown in FIG. 7A, each of the upstream and downstream areas of the discharge region 2 has a set of pre-ionization device provided thereon. Here, so called "upstream" and "downstream" areas refer to areas of the discharge region by which the working gases are flowing earlier and later, respectively. The configuration shown in FIG. 7A has an advantage that the working gases can be ionized sufficiently to ensure more even discharging. In experiments, it is found that heat accumulation is more likely to occur at the downstream area of the discharge region. In view of this, a configuration shown in FIG. 7B can be adopted, where only a set of pre-ionization device is provided on the upstream area of the discharge region. As a result, it is possible to avoid the heat accumulation in the downstream area of the discharge region. As described above, the pre-ionization device can take the configuration where the pre-ionization electrode 8 is provided inside the insulating ceramic tube 7.

3. Fan System of Single-Cavity Dual-Electrode Discharge Cavity

According to an embodiment of the present disclosure, the single-cavity dual-electrode discharge cavity may further comprise a fan system. Because the laser adopts pulsed discharging, the gases in the discharge region should keep fresh in discharging. To do this, two sets of fan impellers 15 are provides inside the cavity body 1 of the discharge cavity to drive the gases 16, so as to pass fresh gases through the discharge region 2 in each discharging.

Each of the impellers 15 can be driven based on a single-motor or dual-motor driving scheme, in a contactless manner with an active or passive magnetic coupler, to prevent the corrosive and harmful gases in the discharge cavity from leaking to the outside.

The fan impellers 15 may comprise cross flow fan impellers, which are commercially available, and can be arranged in a sequential or symmetrical configuration, to improve the uniformity of the flow field.

4. Heat Dissipation System of Single-Cavity Dual-Electrode Discharge Cavity

The discharge cavity needs to be cooled actively because energy injected therein is relatively high. According to an embodiment of the present disclosure, water cooling can be used. Specifically, a heat exchanger 11 can be provided. The heat exchanger 11 may be made of copper. Depending upon heat dissipation requirements, any suitable number of, for example, one or more, heat exchangers 11 can be provided. The heat exchanger(s) can be positioned at an inlet of the impellers 15, and/or downstream a channel of the flow field in the discharge region, to achieve good heat dissipation. In the example shown in FIG. 4, 5 heat exchanger(s) 11 and their exemplary layout are illustrated. However, the present disclosure is not limited thereto.

5. Dust Collection System of Single-Cavity Dual-Electrode Discharge Cavity

The gases stored in the discharge cavity will react with the cavity body and the electrodes during discharging, resulting in reaction products. These impurities are irreversible, and exit in form of particles. To improve lifetimes of the discharging gases, an electrostatic dust collection device 12 may be provided in the discharge cavity, to prevent the products from contaminating the electrodes and optics such as Brewster window. The dust collection device 12 can be provided downstream the flow channel in the discharge region, as shown in FIG. 4.

6. Noise Reduction Process in Single-Cavity Dual-Electrode Discharge Cavity

Under high-frequency operations, local temperature changes of the gases in the discharge cavity will cause acoustic shock waves when the working gases are under fast discharge excitation. Such acoustic shock waves propagate inside the discharge cavity, and are reflected by internal walls of the discharge cavity. This will cause an uneven density distribution of the working gases inside the cavity, resulting in uneven discharging and thus a degraded laser output.

As shown in FIG. 6, to reduce impacts of the shock waves generated in the discharge region 2 on next discharging, a noise reduction process can be made according to an embodiment of the present disclosure. Specifically, for structural parts of the cavity close to the discharge region 2, their surfaces are formed to be rough, to avoid reflection of the shock waves generated during discharging back to the discharge region. Further, on front and back sides of the discharge region 2, sound absorption devices 19, such as perforated acoustic tiles or acoustic screens, can be provided to absorb the shock waves generated during discharging.

7. Optical System of Single-Cavity Dual-Electrode Discharge Cavity

Optical system schemes adapted to existing dual-cavity configurations, such as MOPA and MOPO, are all applicable to the single-cavity dual-electrode discharge cavity described herein. With the discharge cavity described herein, all functions of the MOPA and MOPO configurations can be achieved, and also it is possible to simplify the structural system of the discharge cavity and improve the reliability of the system.

Figure 8:
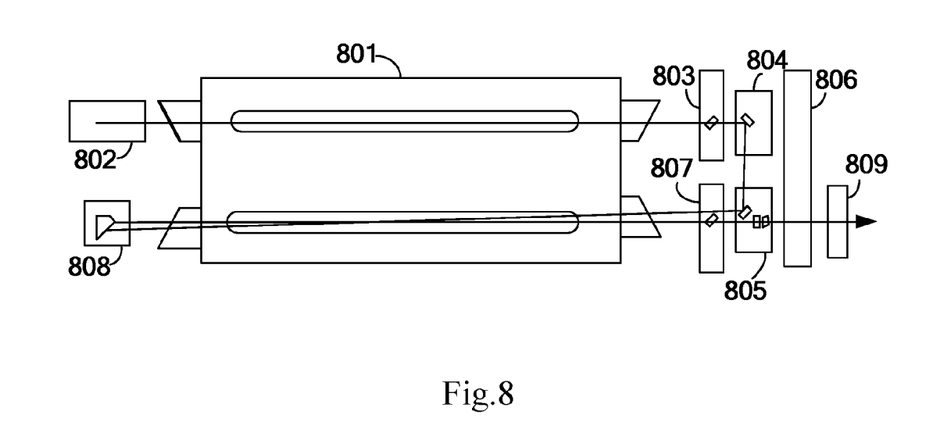
FIG. 8 is a structural view showing a single-cavity MOPA excimer laser according to an embodiment of the present disclosure.
Figure 9:
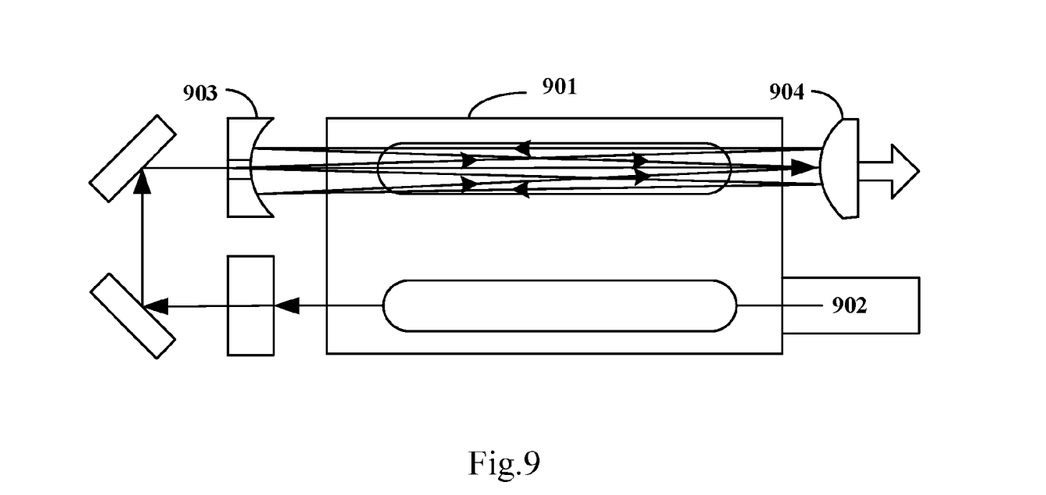
FIG. 9 is a structural view showing a single-cavity MOPRA excimer laser according to an embodiment of the present disclosure.
Figure 10:
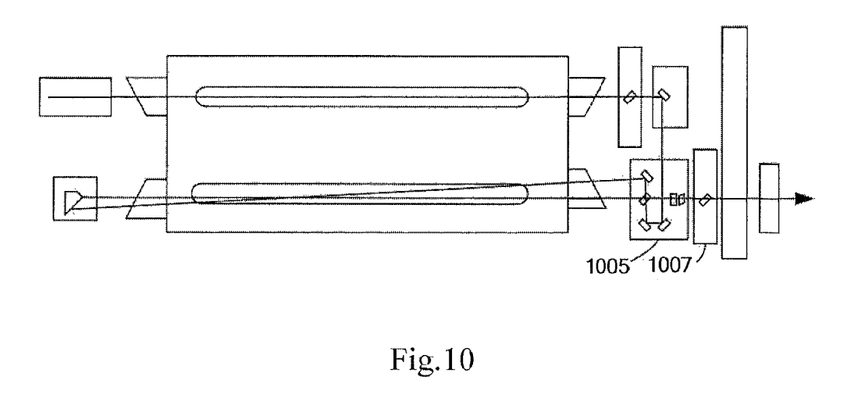
FIG. 10 is a structural view showing a single-cavity MOPO excimer laser according to an embodiment of the present disclosure.

FIG. 8 is a structural view showing a single-cavity dual-electrode MOPA laser, FIG. 9 is a structural view showing a single-cavity dual-electrode MOPRA laser, and FIG. 10 is a structural view showing a single-cavity dual-electrode MOPO laser. Each of these three single-cavity dual-electrode lasers incorporates a single-cavity dual-electrode discharge cavity instead of a dual-cavity configuration in the related art.

FIG. 8 is a structural view showing a single-cavity MOPA excimer laser incorporating a single-cavity dual-electrode discharge cavity. Its system comprises a single-cavity dual-electrode discharge cavity (DDC) 801, a LNM 802, a LAM 803, a MO web 804, a PA web 805, an OPS 806, a BAM 807, a penta prism 808, and an automatic shutter 809. Here, the DDC 801 mainly comprises a discharge cavity body, two sets of main discharge electrodes, two sets of gas cycling systems, a heat dissipation system, a dust collecting device, and a high-voltage pulsed charging module.

FIG. 9 is a structural view showing a single-cavity MOPO excimer laser incorporating a single-cavity dual-electrode discharge cavity. Its system comprises a DDC 901, a PO cavity, a PA cavity, a LNM 902, a concave mirror 903, and a convex mirror 904. Here, the DDC 901 mainly comprises a discharge cavity body, two sets of main discharge electrodes, two sets of gas cycling systems, a heat dissipation system, a dust collecting device, and a high-voltage pulsed charging module.

FIG. 10 is a structural view showing a single-cavity MOPRA excimer laser incorporating a single-cavity dual-electrode discharge cavity. Its system is configured like the MOPA system, except that a PA web 1005 and a BAM 1007 are exchanged in position. Thus, the seed light can get a multi-pass gain.

Each of the three systems described above incorporates the single-cavity dual-electrode discharge cavity for the excimer laser, resulting in simplified structural aspects of the system.

Figure 11:
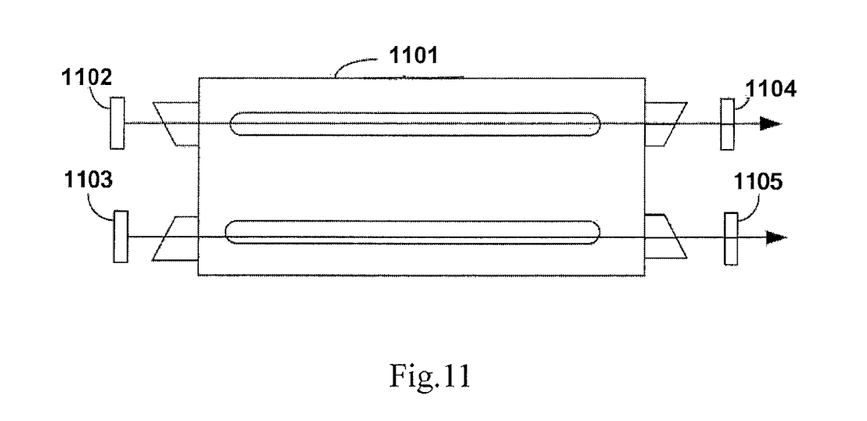
FIG. 11 is a view showing a system where two channels of laser outputs are outputted from a single-cavity dual-electrode excimer laser according to an embodiment of the present disclosure.

Further, with the single-cavity dual-electrode laser described herein, it is possible to achieve two channels of laser outputs. As shown in FIG. 11, a system comprises two high reflectors (HRs) 1102 and 1103, two output mirrors 1104 and 1105, and a single-cavity dual-electrode discharge cavity 1101.

At output ends of the laser, there can be two pairs of Brewster windows, output mirrors, and the like. These components can be arranged according to the related art to achieve the two channels of laser outputs.

8. Power System of Single-Cavity Dual-Electrode Discharge Cavity

A power supply for the single-cavity dual-electrode laser can be designed based on the all solid state pulsed power supply technology.

Objects, solutions and advantages of the present disclosure are described above with reference to the specific embodiments. However, it is to be understood that the specific embodiments are provided for purpose of illustration, rather than limiting the present disclosure. Various changes, replacements, and modifications may be made without deviating from the disclosure, and shall fall in the scope of the present disclosure.

What is claimed is:

1. A single-cavity dual-electrode discharge cavity, comprising:
a cavity body including a left chamber and a right chamber arranged to form a symmetric dual-chamber cavity, wherein each of the chambers has a pear-shaped cross section which is relatively small on an upper side while relatively large on a lower side, and the left and right chambers interface and communicate with each other at a plane of symmetry of the entire discharge cavity; and
two sets of main discharge electrodes each disposed in the left and right chambers, respectively, and having a discharge region respectively positioned in the left and right chambers on the upper side.

2. The single-cavity dual-electrode discharge cavity according to claim 1, wherein each set of the main discharge electrodes comprises an anode and a cathode with the discharge region formed between a discharge surface of the anode and a discharge surface of the cathode.

3. The single-cavity dual-electrode discharge cavity according to claim 2, wherein the cathode is mounted on an insulating plate which is hung at a top end of each of the left and right chambers, and wherein the anode is fixed onto an anode mount which is fixed on the cavity body at such a position that the anode and the cathode are parallel to each other and face each other.

4. The single-cavity dual-electrode discharge cavity according to claim 3, further comprising a pressing bar and a peaking capacitor for discharging and storing, wherein the insulating plate is fixed to the cavity by the pressing bar, and wherein the pressing bar is positioned outside the insulating plate, is connected to an end of the peaking capacitor, and forms a grounded connection with the cavity body.

5. The single-cavity dual-electrode discharge cavity according to claim 4, wherein the other end of the peaking capacitor is connected to a high-voltage pulsed power supply through a conductive metal bar.

6. The single-cavity dual-electrode discharge cavity according to claim 1, further comprising a pre-ionization device positioned on sides of the main discharge electrodes.

7. The single-cavity dual-electrode discharge cavity according to claim 6, wherein there are two sets of the pre-ionization devices for each of the chambers, each of which is positioned on opposite sides of each set of the main discharge electrodes, respectively.

8. The single-cavity dual-electrode discharge cavity according to claim 6, wherein there is one set of the pre-ionization device for each of the chambers, which is positioned on the sides of the main discharge electrodes upstream of the discharge region.

9. The single-cavity dual-electrode discharge cavity according to claim 6, wherein the pre-ionization device comprises an upper portion and a lower portion, each of which comprises a ceramic tube and a pre-ionization electrode, wherein the pre-ionization electrode is positioned inside the ceramic tube.

10. The single-cavity dual-electrode discharge cavity according to claim 9, wherein the ceramic tube of the upper portion of the pre-ionization device is fixed onto the cathode through an insulator, and the ceramic tube of the lower portion of the pre-ionization device is fixed onto the anode through an insulator.

11. The single-cavity dual-electrode discharge cavity according to claim 2, wherein each of the anodes is connected to the cavity body of the discharge cavity through a set of copper sheets.

12. The single-cavity dual-electrode discharge cavity according to claim 1, further comprising a fan system configured to drive gases inside the discharge cavity.

13. The single-cavity dual-electrode discharge cavity according to claim 1, further comprising a heat dissipation system configured for heat dissipation from the discharge cavity.

14. The single-cavity dual-electrode discharge cavity according to claim 1, further comprising a dust collecting system configured to collect dust in the discharge cavity.

15. The single-cavity dual-electrode discharge cavity according to claim 1, further comprising a noise reduction system configured to reduce noises in the discharge system.

16. A single-cavity dual-electrode MOPA laser, comprising the single-cavity dual-electrode discharge cavity according to claim 1.

17. A single-cavity dual-electrode MOPO laser, comprising the single-cavity dual-electrode discharge cavity according to claim 1.

18. A single-cavity dual-electrode MOPRA laser, comprising the single-cavity dual-electrode discharge cavity according to claim 1.

* * * * *